United States Patent [19]

Amemiya et al.

[11] Patent Number: 4,636,424
[45] Date of Patent: Jan. 13, 1987

[54] MOISTURE-PERMEABLE WATERPROOF LAMINATED FABRIC AND PROCESS FOR PRODUCING THE SAME

[75] Inventors: Kunio Amemiya, Hirakata; Mikihiko Tanaka, Daito; Kenichi Kamemaru; Kiyoshi Nakagawa, both of Uji, all of Japan

[73] Assignee: Unitika Ltd., Japan

[21] Appl. No.: 689,322

[22] Filed: Jan. 7, 1985

[30] Foreign Application Priority Data

| Jan. 23, 1984 | [JP] | Japan | 59-10853 |
| Feb. 17, 1984 | [JP] | Japan | 59-29232 |
| Aug. 31, 1984 | [JP] | Japan | 59-183277 |
| Aug. 31, 1984 | [JP] | Japan | 59-183278 |
| Sep. 7, 1984 | [JP] | Japan | 59-188435 |
| Sep. 13, 1984 | [JP] | Japan | 59-191932 |

[51] Int. Cl.$^4$ .................. B32B 5/18; B32B 5/22; B32B 7/14; B32B 27/40

[52] U.S. Cl. .................. 428/198; 427/245; 428/246; 428/286; 428/315.5; 428/315.9; 428/316.6; 428/423.1

[58] Field of Search .......... 428/198, 246, 252, 286, 428/315.5, 315.7, 315.9, 316.6, 423.1; 427/245

[56] References Cited

U.S. PATENT DOCUMENTS

| 4,429,000 | 1/1984 | Naka et al. | 428/315.5 |
| 4,539,255 | 9/1985 | Sato et al. | 428/315.5 |

*Primary Examiner*—William J Van Balen
*Attorney, Agent, or Firm*—Joseph W. Farley

[57] ABSTRACT

A moisture-permeable waterproof laminated fabric comprising a water-repellant base fabric and at least one porous film provided on one surface of the base fabric. The porous film is formed of a synthetic polymer composed chiefly of a polyamino acid urethane resin and has numerous fine pores provided by microcells which are continuous in the direction of its thickness. The laminated fabric has satisfactory waterproofness and moisture permeability as required for munition, survival and sport uses.

35 Claims, No Drawings

MOISTURE-PERMEABLE WATERPROOF LAMINATED FABRIC AND PROCESS FOR PRODUCING THE SAME

The present invention relates to laminated fabrics having the two properties of waterproofness and moisture permeability and to a process for producing the same Various moisture-permeable waterproof fabrics are commercially available recently. From the viewpoint of processing techniques, they are divided into the coating lamination type, the adhesively bonded lamination type and the high-density fabric type.

Moisture-permeable waterproof fabrics of the coating lamination type are prepared by forming a porous film or films over a base fabric by dry or wet coating as disclosed in U.S. Pat. No. 4,429,000. According to this patent, a porous polyurethane elastomer film is formed on the base fabric by wet coagulation with use of a solution of polyurethane elastomer, water repellent, polyisocyanate and nonionic surfactant in a polar organic solvent. The film has numerous fine pores extending in the direction of its thickness. These fine pores are so sized that they do not pass liquid water, i.e. large groups of water molecules associated together by hydrogen bonds, but readily pass water vapor, i.e. individually independent water molecules. The film therefore has waterproofness and also moisture permeability. Fabrics of the adhesively bonded lamination type comprise, for example, a porous polyurethane elastomer film having numerous fine pores extending in the direction of thickness of the film and bonded to a base fabric by an adhesive layer (of acrylic resin or the like). Moisture-permeable waterproof fabrics of the high-density fabric type comprise a fabric woven of superfine filaments with a high density and merely treated with a water-repellency finish.

The fabric of the coating lamination type, as well as of the adhesively bonded lamination type, is prepared with consideration given to the balance between waterproofness and moisture permeability, so that when the fabric is designed to have waterproofness of at least 1500 mm water column (as determined according to JIS L-1096, Water Pressure Resistance Measuring Method), the moisture permeability thereof is limited to about 4000 to about 5000 $g/m^2.24$ hrs (as determined according to the measuring method of JIS Z-0208). Consequently when the fabric is worn during working or exercising in the rain, the wearer feels stuffy. Further because the polyurethane elastomer, acrylic resin or the like which is used for forming the porous film or adhesive layer hardens at low temperatures, the porous film, although having excellent waterproofness initially, becomes damaged to exhibit impaired waterproofness when the fabric is worn at low temperatures. Accordingly the fabric is not usable for munition and survival uses. On the other hand, the high-density fabric has high moisture permeability, is free of the problem of hardening at low temperatures but is not satisfactory in waterproofness since it is merely treated with a water-repellency finish.

Accordingly, an object of the present invention is to provide a moisture-permeable waterproof laminated fabric which has satisfactory waterproofness (for example of at least 1500 mm water column) and high moisture permeability (for example of 6000 to 7000 $g/m^2.24$ hrs) and which does not harden at low temperatures.

According to a first aspect of the present invention, there is provided a moisture-permeable waterproof laminated fabric comprising a water-repellent base fabric and at least one porous film provided on one surface of the base fabric, the porous film being formed of a synthetic polymer composed chiefly of a polyamino acid urethane resin, the porous film having numerous fine pores provided by microcells continuous in the direction of its thickness.

According to a second feature of the present invention, there is provided a process for producing a moisture-permeable waterproof laminated fabric characterized in that the process includes the film forming step of coating one surface of a base fabric with a resin solution comprising a polyamino acid urethane resin, a pore forming agent and a polar organic solvent and thereafter immersing the fabric in water, and the water-repellency treatment step of applying a water repellent to the base fabric and thereafter heat-treating the fabric.

According to a third aspect of the present invention, there is provided a process for producing a moisture-permeable waterproof laminated fabric characterized in that the process includes the first film forming step of coating one surface of a base fabric with a resin solution comprising a compound having a high affinity for the base fabric, a polyamino acid urethane resin and a polar organic solvent and thereafter immersing the fabric in water to form a porous film on the fabric, the second film forming step of coating the porous film with a resin solution comprising a polyamino acid urethane resin, a pore forming agent and a polar organic solvent and thereafter immersing the fabric in water, and the water-repellency treatment step of applying a water repellent to the base fabric and thereafter heat-treating the fabric.

According to a fourth aspect of the present invention, there is provided a process for producing a moisture-permeable waterproof laminated fabric characterized in that the process includes the film forming step of coating a releasable sheet with a resin solution comprising a polyamino acid urethane resin, a pore forming agent and a polar organic solvent and thereafter immersing the sheet in water to form a porous film on the sheet, the step of bonding the porous film to a base fabric with an adhesive and thereafter peeling the sheet off the porous film, and the water-repellency treatment step of applying a water repellent to the base fabric and thereafter heat-treating the fabric.

The base fabric is a woven fabric, knitted fabric, nonwoven fabric or the like made of at least one of polyamide synthetic fibers which are typically nylon 6 and nylon 66 fibers, polyester fibers typical of which is polyethylene terephthalate fiber, polyacrylonitrile synthetic fibers, polyvinyl alcohol synthetic fibers, semisynthetic fibers such as triacetate fiber, blended fibers of nylon/cotton, polyethylene terephthalate/cotton, etc. and natural fibers. The fabric may be made of such fibers in desired combination. The base fabric may be a calendered fabric or one treated with a water-repellency finish.

The resin solution to be used according to the second aspect of the present invention contains a polyamino acid urethane resin (hereinafter referred to briefly as "PAU resin"). This resin is a copolymer of an amino acid and a urethane. Examples of useful amino acids are DL-alanine, L-aspargic acid, L-cysteine, L-glutamic acid, glycine, L-lysine, L-methionine, L-leucine and derivatives of these acids. While generally used for the synthesis of polyamino acids are amino acid N-carboxylic acid anhydrides (N-carboxylic acid anhydride being hereinafter referred to as "NCA") obtained from amino acids and phosgene, optically active γ-alkyl-glutamate NCA's are desirable in view of the properties of the film to be formed. Of these optically active γ-alkyl-glutamate NCA's, γ-methyl-L-glutamate NCA or γ-methyl-D-glutamate NCA is generally advantageous to use as the amino acid component of the PAU resin. Useful isocyanate components of polyurethanes are aromatic diisocyanates, aliphatic diisocyanates and alicyclic diisocyanates, which are used singly or in admixture. Examples of such diisocyanates are tolylene 2,4-diisocyanate, 4,4'-diphenylmethane diisocyanate, 1,6-hexane diisocyanate, 1,4-cyclohexane diisocyanate, etc. Useful polyol components of polyurethanes are polyether polyols and polyester polyols. Examples of such polyether polyols are polyethyelne glycol, polypropylene glycol, polytetramethylene glycol and the like. Examples of suitable polyester polyols are a reaction product of a diol, such as ethyelne glycol or propylene glycol, and a dibasic acid, such as adipic acid or sebacic acid, caprolactone and like ring-opening polymerization products. Examples of amines useful for the copolymerization of amino acid and polyurethane are ethylenediamine, diethylamine, triethylamine, ethanolamine and the like. Thus, the PAU resin is obtained by adding an amine to the reaction system of an amino acid NCA and a urethane prepolymer having isocyanate endings.

Among PAU resins, the reaction product of an optically active γ-alkyl-glutamate NCA and a urethane prepolymer is preferable to use because the above reaction product, which is obtained, for example, in the solvent mixture of dimethylformamide and dioxane, forms a uniform resin solution with a polar organic solvent at an amino acid to urethane weight ratio in the wide range of 90:10 to 10:90 and is therefore advantageous in coatability and amenability to the wet film forming process, and further because the above weight ratio can be determined freely in accordance with the film properties required.

Examples of useful polar organic solvents for forming the resin solution are dimethylformamide, dimethylacetamide, N-methylpyrrolidone, hexamethylphosphonamide and the like. These solvents are highly soluble in water. When a solution of water-insoluble resin in such a solvent is immersed in water, the solvent alone dissolves in water, permitting the resin to coagulate in water. Such a resin coagulating method is generally termed a wet resin coagulation process.

Examples of pore forming agents which are to be contained in the resin solution are anionic surfactants, nonionic surfactants, hydrophilic high polymers, polyurethane elastomers, etc. Based on the PAU resin, the preferred amount of the agent to be used is 0.1 to 10% by weight in the case of anionic or nonionic surfactants, 1 to 20% by weight for hydrophilic high polymers, or 5 to 50% by weight for polyurethane elastomers. When the amount of the pore forming agent is less than the lower limit, the pores formed in the PAU resin film will be too small to result in poor moisture permeability, whereas if the amount exceeds the upper limit, excessively large pores will be formed, failing to give water pressure resistance of at least 1500 mm water column.

Anionic surfactants useful as pore forming agents include known alkylsulfuric acid ester salts, alkylbenzenesulfonates, α-olefinsulfonates, alkylsulfonates, fatty acid amide sulfonates, dialkylsulfosuccinates and optional mixtures of such salts.

Suitable nonionic surfactants include polyoxyethylene alkyl ethers, polyethylene alkyl phenyl ethers, polyoxyethylene fatty acid esters, polyoxyethylene fatty acid amide ethers, polyhydric alcohol fatty acid esters, polyoxyethylene polyhydric alcohol fatty acid esters, fatty acid sucrose esters, alkylol-amide, etc. and optional mixtures of such compounds.

Examples of hydrophilic high polymers are polyvinylpyrrolidone, polyacrylic acid, polyacrylic acid esters, carboxyvinyl polymer organic amines, polyethyleneimine, etc. The term "hydrophilic high polymers" refers to high polymers which are soluble in water and which can be dissolved, dispersed or emulsified in polar organic solvents.

Polyurethane elastomers are polymers obtained by reacting polyisocyanates with polyols. Useful polyisocyanates include known aliphatic and aromatic polyisocyanates such as hexamethylene diisocyanate, tolylene diisocyanate, xylene diisocyanate, and reaction products of an excess of such a diisocyanate and a polyhydric alcohol. Useful polyols are those already known and usually used for preparing polyurethane resins, such as polyethers and polyesters. Examples of suitable polyesters are reaction products of polyhydric alcohols, such as ethylene glycol, diethylene glycol and 1,4-butanediol, and polybasic carboxylic acids, such as adipic acid, oxalic acid and sebacic acid. Exemplary of suitable polyethers are adducts of polyhydric alcohols, such as ethylene glycol and propylene glycol, with one or at least two of ethylene oxide, propylene oxide, butylene oxide and like alkylene oxides.

The pore forming agents function as follows during the wet film forming step. The anionic or nonionic surfactant promotes diffusion of the polar organic solvent from the resin component into water, whereby microcells of suitable size are formed in the film. In the case of the hydrophilic high polymer, the high polymer is extracted during the wet film forming step and the subsequent rinsing step, with the result that microcells are formed in the film. On the other hand, when the polyurethane elastomer and the PAU resin are immersed in water at the same time, the PAU resin coagulates more rapidly than the polyurethane resin. Consequently interstices are produced at the boundary between the PAU resin and the polyurethane resin, and these interstices form fine pores in the resin film.

According to the second aspect of the present invention, the resin solution of PAU resin, pore forming agent and polar organic solvent described above is applied to a base fabric by a known coating method. Preferably the amount of PAU resin to be applied is at least 5 g/m² calculated as a pure resin. If the amount of deposition of the PAU resin is less than 5 g/m², it is difficult to obtain water pressure resistance of at least 1500 mm water column.

The base fabric thus coated with the resin solution is subsequently immersed in water. Consequently the PAU resin undergoes wet coagulation, while fine pores up to 5 μm in surface diameter are formed by the spontaneous diffusion of the polar organic solvent from the resin component into the water and also by the action of the pore forming agent, whereby a porous film is obtained. Preferably the water has a temperature of 0° to 30° C. If the temperature is above 30° C., the polar solvent diffuses into the water more rapidly to form larger pores in the resin film, with the result that the fabric is likely to exhibit poor water pressure resistance. The immersion time should be at least 10 seconds. If the time is less than 10 seconds, the resin will not coagulate fully, failing to give a satisfactory PAU resin film.

The laminated fabric having the porous PAU resin film formed in water is then rinsed in hot water to remove the remaining solvent. The fabric is rinsed at a bath temperature of 30° to 80° C. for at least 3 minutes although the rinsing conditions are variable according to the amounts of the PAU resin and pore forming agent used. The rinsed fabric is dried.

The base fabric is subjected to a water-repellency treatment before or after the wet formation of the porous PAU resin film. Useful water repellents are those already known, such as paraffin water repellents, silicone water repellents, zirconium water repellents, fluorine water repellents, etc. The repellent may be applied by a known method which is generally used, for example, by padding, spraying or coating. When especially high water repellency is required, use of a fluorine water repellent is recommended. For example, 5% aqueous solution of Asahi Guard 730 (fluorine water-repellent emulsion, product of Asahi Glass Co., Ltd.) may be applied to the base fabric by padding (pick-up ratio: 35%), followed by heat treatment at 160° C. for 1 minute. Preferably the base fabric has water repellency of at least 90 (according to JIS L-1096, Spray Method).

Conventional moisture-permeable waterproof laminated fabrics having a porous urethane resin film exhibit moisture permeability of as low as about 5000 g/m$^2$.24 hrs if highest when having water pressure resistance of at least 1500 mm water column, whereas wet coating of the base fabric with the PAU resin produces the surprising result that the fabric exhibits moisture permeability of at least 7000 g/m$^2$.24 hrs and water pressure resistance of at least 1500 mm water column. Although the reason why the PAU resin wet coating process affords such high water pressure resistance and high moisture permeability still remains to be clarified, an observation of the section of the PAU resin film on the moisture-permeable waterproof laminated fabric obtained reveals that the PAU resin film has a larger number of smaller microcells with more uniform distribution than the polyurethane resin film. Presumably this results in the high moisture permeability and high water resistance. The high moisture permeability appears attributable also to the fact that the PAU resin itself has a high affinity for water vapor.

An investigation into the molecular structure of the PAU resin useful for the present invention shows that the PAU resin is formed by the block copolymerization of an amino acid and urethane, the amino acid component (amino acid block) chiefly forming an α-helix structure, the urethane component (urethane block) forming a random coil structure. This has been substantiated by the assignment of amino band of the infrared absorption spectrum obtained for the wet-coagulated porous film of the invention (amide V 615 cm$^{-1}$; key band of α-helix conformation of poly-γ-alkyl-L-glutamate). Generally in the case of amino acid resins, the high diffusion coefficient thereof affords high moisture permeability, presumably owing to the α-helix structure of the amino acid resin having a large side chain. Generally in view of the above, it is very likely that the PAU resin has a loose packing structure between the two blocks thereof, i.e. the amino acid block of α-helix structure and the urethane block of random coil structure. Therefore it appears that the PAU resin itself, unlike the polyurethane elastomer, has high permeability to water vapor due to the loose packing state of the molecular structure, amide bond of the PAU resin and the intermolecular hydrogen bond of water.

According to the second aspect of the present invention, the PAU resin solution is applied to the base fabric and coagulated wet to give a moisture-permeable waterproof laminated fabric. In order to give the porous film improved resistance to peeling off the base fabric, the resin solution may have incorporated therein a compound having a high affinity for the base fabric. Useful as such a compound is an adhesive composed chiefly of at least one of an isocyanate compound, polyamide resin and polyurethane resin when the base fabric is a woven or knitted fabric which is made chiefly of polyamide synthetic fiber. When the base fabric is a woven or knitted fabric which is made mainly of polyester synthetic fiber, an adhesive is used which is composed chiefly of at least one of polyester resin and polyurethane resin. An isocyanate compound is usable as a crosslinking agent for this adhesive. Generally the compound having a high affinity for the fiber used is one which is close to the fiber in the solubility parameter which is determined from the cohesive energy of the functional group of the chemical structural formula. The solubility parameter, which is initially proposed by J. H. Hildebrand, is represented by δ and expressed by $δ = (E/V)^{\frac{1}{2}}$ wherein E is the cohesive energy, and V is molecular volume. While this value serves as a measure of miscibility between liquids, it is used also as a measure of affinity from the viewpoint of adhesion theory.

Examples of useful isocyanate compounds are 2,4-tolylene diisocyanate, diphenylmethane diisocyanate, isophorone diisocyanate, hexamethylene di-isocyanate, and triisocyanates obtained by the addition reaction of 3 moles of such diisocyanate with 1 mole of a compound having active hydrogen (such as trimethylolpropane or glycerin). These isocyanates may have free isocyanate groups, or may be those stabilized by the addition reaction with phenol, methyethylketoxime or the like, followed by heat treatment for the dissociation of the block. Thus, a suitable compond is selected for use according to the ease of handling, or use. Preferably the isocyanate compound is used in an amount of 0.1 to 10% by weight, more preferably 0.5 to 5% by weight, based on the PAU resin. If the amount is less than 0.1% by weight, the resin will exhibit poor adhesion to the base fabric, whereas if it is above 10%, the resulting fabric will have a hard hand, hence objectionable.

Examples of suitable polyamide resins are copolymers of nylon 6, nylon 6,6 and nylon 6,10, aliphatic polyamides such as N-methoxymethyl 6,6 nylon which is obtained by methoxymethylating the hydrogen of amino group of the corresponding nylon, and polyamides of the dimer acid type typical of which is Versamid.

Examples of useful polyurethane resins are polymerization products of polyols, such as polyether polyol, polyester polyol, grafted polyols, halogenated polyols, diene chain-containing polyols, polycarbonate polyol and acrylic polyol, and isocyanates, such as tolylene diisocyanate, diphenylmethane diisocyanate, polymeric diphenylmethane diisocyanate and hexamethylene di-isocyanate. In some cases, diamines and the like are usable as crosslinking agents or chain lengthening agents.

Exemplary of suitable polyester resins are polymerization products of diols, such as ethylene glycol, diethylene glycol, propylene glycol, 1,4-butane diol, 1,6-hexane diol and polytetramethylene glycol, and aromatic or aliphatic dicarboxylic acids, such as isophthalic acid, terephthalic acid, adipic acid and sebacic acid, lactones and like ring-opening polymerization products, etc. The diol component and the acid component are so selected as to give an amorphous polymer which is soluble in polar organic solvents. Preferable to use are polyesters having a molecular weight of 20,000 to 30,000 and prepared by polymerizing terephthalic acid and sebacic acid as acid components with ethylene glycol and neopentyl glycol as diol components.

The polyamide, polyurethane or polyester resin is used in an amount of 5 to 100% by weight, preferably 5 to 50% by weight, based on the PAU resin. If the amount is less than 5% by weight, the resin exhibits poor adhesion to the base fabric, whereas if it is in excess of 100% by weight, the resulting fabric has one of the drawbacks of hard hand, thermally deformed resin film and reduced moisture permeability. It is therefore desirable to limit the amount to not larger than 100% by weight.

When desired to give improved water resistance to the porous film itself to be formed by wet coagulation, the film forming resin solution may have incorporated therein a water repellent of the fluorine, silicone, zirconium or like type. Preferably the water repellent is one which is compatible with the polar organic solvent to be used. Examples of such water repellents are fluoroalkyl-containing acrylate solvent-type water repellents, tetrafluoroethylene or fluorinated vinylidene resins, and silicone water repellents such as methylhydrogenpolysiloxane and dimethylpolysiloxane.

It is further advantageous to apply a polysiloxane resin to the laminated fabric obtained by forming a porous film on the base fabric. Examples of useful polysiloxanes are dimethylpolysiloxane, phenyl-containing polysiloxane, modified silicone oils such as amino- or olefin-modified silicone oils, methylhydrogenpolysiloxane, and mixture of dimethylpolysiloxane and methylhydrogenpolysiloxane. While a suitable polysiloxane is selected according to the contemplated use, it is desirable in this invention to use dimethylpolysiloxane having a molecular weight of 5,000 to 30,000. First, the polysiloxane treatment smooths the laminated fabric to reduce the abrasion or damage of the porous film due to frictional contact with other fabric. Because of the smoothing effect, the fabric, even without a lining fabric, can be worn smoothly. Second, the siloxane resin deposits in the structure of the fabric to reduce friction between the constituent yarns of the fabric and consequently provides a soft hand. Third, the polysiloxane resin imparts enhanced water repellency to the fabric. For the treatment, the polysiloxane may be applied in the form of an aqueous dispersion or emulsion, but in order to preclude treatment spots, it is desirable to apply the compound in the form of a solution in a chlorinated hydrocarbon, such as 1,1,1-trichloroethane, trichloroethylene or perchloroethylene, or other solvent, such as toluene, hexane or mineral terpene. The polysiloxane resin may be applied by a usual method, for example, by padding, coating or spraying. The amount of deposition of the polysiloxane is preferably at least 0.1% by weight, calculated as solids and based on the weight of the fiber. Because the polysiloxane resin affords water repellency as stated above, the water-repellency treatment to be conducted separately can be omitted.

According to the third aspect of the present invention, a base fabric (the same as the one used for the first aspect) is subjected to a first film forming step for forming a first porous film, a second film forming step for forming a second porous film over the first porous film, and a water-repellency treatment step.

Employed for the first film forming step is a resin solution comprising a PAU resin, a compound having a high affinity for the base fabric and a polar organic solvent. The components of the resin solution (PAU resin, etc.) are the same as those already described in detail with reference to the second aspect of the invention. The resin solution is applied to the base fabric by a known coating method. Generally the resin solution is applied in an amount of 2 to 60 g/m$^2$, calculated as pure PAU resin, in view of the performance of the machine.

The coated base fabric is immersed in water having a temperature of 0° to 30° C. A satisfactory result can be obtained when the immersion time is at least 10 seconds. Consequently the PAU resin is coagulated wet, while the polar organic solvent spontaneously diffuses from the resin component into the water to form fine pores, whereby a first porous film is formed. When the resin solution is applied in such an amount that the amount of deposition of the PAU resin is not smaller than 10 g/m$^2$, the first porous film is likely to have insufficient moisture permeability, becasue the fine pores formed by the spontaneous diffusion of the polar solvent into the water are relatively small. To avoid the likelihood, the resin solution needs to contain a pore forming agent such as those already mentioned.

The laminated fabric having the first porous film formed wet is rinsed with hot water to remove the remaining solvent. The fabric is rinsed at a temperature of 30° to 80° C. for at least 3 minutes although the rinsing condition varies with the kind of PAU resin and the affinity compound with the base fabric. The rinsed fabric is dried.

The second film forming step forms a second porous film over the first porous film with use of a resin solution comprising a PAU resin, a pore forming agent and a polar organic solvent. In this case, the procedure from the resin solution coating through drying is executed in the same manner as the porous film forming procedure described with reference to the second aspect of the present invention. Details as to the PAU resin, pore forming agent and polar organic solvent are the same as those already stated. The resin solution for forming the second porous film may contain an isocyanate compound in an amount of foregoing range to give improved bond strength between the first and second porous films.

The water-repellency treatment for the base fabric is conducted before the first film forming step or after the second film forming step with use of one of the water-repellents mentioned. The water-repellency treatment may be conducted before the first film forming step and also after the second film forming step. This provides further improved waterproofness.

When required, the laminated fabric is treated with a polysiloxane resin after the formation of the two porous films and is thereby given smoothness and a soft feel. When the water repellency of the polysiloxane resin is thus given, the separate water-repellency treatment can be omitted. On the other hand, when still higher water resistance is required, it is possible to incorporate a water repellent, which will not impair the adhesion between the base fabric and the first porous film, into the first film forming resin solution and/or the second film forming resin solution, the repellent being selected from among known water repellents including fluorine repellents, silicone repellents and zirconium repellents.

According to the third aspect of the present invention, the first porous film, which contains a compound having a high affinity for the base fabric, renders the combination of two porous films bondable to the base fabric with improved effectiveness.

Instead of forming the first porous film according to the third aspect of the invention, a compound having a high affinity for the base fabric may be applied as an adhesive to the base fabric in the form of spots or lines to provide a discrete adhesive layer, and a porous film of PAU resin may be formed wet over the adhesive layer, whereby the porous film can be bonded to the base fabric also effectively.

A moisture-permeable waterproof laminated fabric of the adhesively bonded lamination type (fourth aspect of the invention) is produced by the step of forming a porous film on a releasable sheet with use of a resin solution, the step of bonding the porous film to a base fabric (of the same material as the one used for the first aspect) with an adhesive and thereafter peeling the sheet off the film, and a water-repellency treatment step. This process employs an indirect bonding method with use of the adhesive and is therefore especially advantageous when the base fabric has surface irregularities, is relatively rough-surfaced, has high air permeability or is stretchable greatly.

The sheet to be used for the film forming step is a taffeta, film, paper or the like which is smooth-surfaced, such that at least the surface thereof is made of a substance having a low affinity for the PAU resin. If the sheet surface has a high affinity for the PAU resin, it is impossible to peel the sheet off the laminated base fabric and to obtain the desired moisture-permeable waterproof laminated fabric. Examples of substances having low affinity for PAU resins are polyester resins which are polycondensation products of diols and dibasic acids and typical of which is polyethylene terephthalate, polyolefin resins typical of which are polyethylene and polypropylene, silicone resins comprising dimethylpolysiloxane or methylhydrogenpolysiloxane, and fluorocarbon resins typical of which is polytetrafluoroethylene. The sheet may be made entirely of such a substance, or may be one which is treated with the substance only at the surface layer (such as release paper). Sheets of these types are fully usable provided that they remain free of damage during the wet film forming step.

The resin solution for use in the film forming step comprises a PAU resin, pore forming agent and polar organic solvent. These components are the same as those already described in detail with reference to the second aspect of the present invention. Depending on the material of the sheet to be used, the resin solution needs to contain an isocyanate compound (as exemplified for the second aspect) to give the PAU resin the adhesion required for the wet film forming step. Preferably the isocyanate compound is used in an amount of 0.1 to 5% by weight, more preferably 0.5 to 3% by weight, based on the PAU resin. If the amount is less than 0.1% by weight, the film forming resin exhibits poor adhesion to the sheet, and the film is likely to separate off during the wet film forming step. Conversely, if the amount is above 5% by weight, excessively strong adhesion of the resin presents difficulty in peeling the sheet off the laminated fabric and gives a hard feel, hence undesirable.

The resin solution is used for forming a porous film on the sheet by wet coagulation method. The procedure for resin solution coating through drying is executed in the same manner as the porous film forming procedure described with reference to the second aspect of the invention.

The adhesive to be used for the bonding step is not limited particularly insofar as it has such adhering properties that the film will not peel off the base fabric when the fabric is rubbed or washed. It is desired that the porous film be bonded to the base fabric by point or spot bonding so as not to impair the moisture permeability of the laminated fabric to the greatest possible extent. For the application of the adhesive in the form of points or spots, it is suitable to use the gravure roll coating method from the viewpoint of the amount of application, hand of the resulting laminated fabric, bond strength, ease of application, etc. Depending on the kind of adhesive, the dry method or wet method is used for bonding the film to the base fabric. The adhesive may be applied in the form of lines.

After the porous film as formed on the sheet is bonded to the base fabric with the adhesive, the sheet is peeled off the porous film.

The water-repellency treatment step can be performed in the same manner as in the case of the second aspect of the invention with use of a similar water repellent. Of course, the water-repellency treatment may be performed before the film forming step or after the sheet has been peeld off the porous film bonded to the base fabric.

As is the case with the coating type, the laminated fabric may be treated with a polysiloxane resin, or the resin coating solution may have a suitable water repellent incorporated therein.

The moisture-permeable waterproof laminated fabric of the adhesively bonded type thus prepared is slightly lower in moisture permeability than the laminated fabric of the coating type because an adhesive is provided between the base sheet and the porous film. However, the fabric has water pressure resistance of at least 1500 mm water column and moisture permeability of at least 6000 g/m$^2$.24 hrs and is fully satisfactory in properties.

The present invention will be described with reference to the following examples, in which properties were determined and evaluated by the following methods.

(1) Water pressure resistance: JIS L-1096 (Low Water Pressure Method)
(2) Moisture permeability: JIS Z-0208
(3) Peeling strength: JIS K-6328
(4) Washing resistance:
The fabric was washed repeatedly ten times according to JIS L-0842 (A-2 Method) and thereafter checked for the peeling of the porous film.
(5) Elongation:
The elongation of the fabric was measured under a load of 1.5 kg according to JIS L-1080 (A Method).
(6) Water repellency: JIS L-1096 (Spray Method)
(7) Abrasion resistance:
Using a rubbing tester (Gakushin type), the fabric was rubbed 1000 times under a load of 200 g and thereafter checked for the appearance of the surface of the porous film. The result was evaluated according to the following criteria.
O . . . free from noticeable damage
X . . . noticeable damage

EXAMPLE 1

The PAU resin to be used in the present example was prepared first by the following process.

A 1970 g quantity of polytetramethylene glycol (OH value: 56.9) was reacted with 504 g of 1,6-hexamethylene diisocyanate at 90° C. for 5 hours to obtain a urethane prepolymer (NCO equivalent:2340) having isocyanate ending. A 85 g portion of the urethane prepolymer and 85 g of γ-methyl-L-glutamate NCA were dissolved in 666 g of a solvent mixture of dimethylforxamide/dioxane (weight ratio: 7/3), and 50 g of 2% triethylamine solution was added to the solution with stirring. The mixture was reacted at 30° C. for 5 hours, giving a satisfactorily fluid, yellowish brown, milky and turbid solution of PAU resin X having a viscosity of 32,000 cps (25° C.). The PAU resin X was used for Formulations 1 to 5 given below.

On the other hand, 5% aqueous solution of Asahi Guard 730, a fluorine water-repellent emulsion (manufactured by Asahi Glass Co., Ltd.), was applied by padding (pick-up ratio: 35%) to a plain weave fabric (taffeta, as scoured and dyed with an acid dye) comprising warps of nylon 70 denier/24 filaments and wefts of nylon 70 denier/34 filaments and having a warp density of 120 yarns/inch and a weft density of 90 yarns/inch. The fabric was then heat-treated at 160° C. for 1 minute and treated by a calender having mirror-finish rolls at a temperature of 170° C., pressure of 30 kg/cm and speed of 20 m/min. Subsequently the fabric was coated with a resin solution of Formulation 1 below having a resin solids concentration of 20% by a knife-over-roll coater in an amount of 15 g/m² (wet weight, the same as hereinafter) and thereafter immersed in a water bath of 20° C. for 30 seconds to coagulate the resin. (In the Formulations to follow, the parts are all by weight.)

| Formulation 1 | |
|---|---|
| PAU resin X | 100 parts |
| CRISVON BL-50 | 2 parts |
| (isocyanate compound, product of Dainippon Ink & Chemicals Inc.) | |
| Dimethylformamide | 10 parts |

The laminated fabric was immersed in hot water at 50° C. for 5 minutes and then dried, whereby the first step of the present example was completed.

Next, as the second step of the present example, the laminated fabric obtained by the first step was coated, over the film surface, with a resin solution of Formulation 2 below by a knife-over-roll coater in an amount of 50 g/m², then immersed in a water bath at 20° C. for 30 seconds to coagulate the resin, thereafter rinsed in hot water at 50° C. for 10 minutes and dried to obtain a laminated fabric A. The same procedure as above was repeated except that resin solutions of Formulations 3 to 5 were used for the second step to obtain fabrics B to D, respectively.

| Formulation 2 | |
|---|---|
| PAU resin X | 100 parts |
| CRISVON ASSISTOR SD-7 | 3 parts |
| (nonionic surfactant serving as a pore forming agent, product of Dainippon Ink & Chemicals Inc.) | |
| Dimethylformamide | 15 parts |
| Formulation 3 | |
| PAU resin X | 100 parts |
| CRISVON AW-7H | 8 parts |
| (polyurethane elastomer serving as pore forming agent, product of Dainippon Ink & Chemicals Inc.) | |
| Dimethylformamide | 15 parts |
| Formulation 4 | |
| PAU resin X | 100 parts |
| Polyacrylic acid | 2 parts |
| (hydrophilic high polymer serving as pore forming agent and having a molecular weight of 30,000) | |
| Dimethylformamide | 15 parts |
| Formulation 5 | |
| PAU resin X | 100 parts |
| CRISVON AW-7H | 5 parts |
| (polyurethane elastomer serving as pore forming agent, product of Dainippon Ink & Chemicals Inc.) | |
| CRISVON ASSISTOR SD-11 | 1 part |
| (anionic surfactant serving as pore forming agent, product of Dainippon Ink & Chemicals Inc.) | |
| Dimethylformamide | 15 parts |

As the third step, 4% mineral terpene solution of Shin-Etsu Silicone Oil KF-96 (dimethylpolysiloxane, product of Shin-Etsu Chemical Co., Ltd.) was applied to the laminated fabrics A, B, C and D by padding (pick-up ratio: 40%) and then dried. The fabrics were thereafter treated at 170° C. for 1 minute for finishing as stretched over a tenter.

The properties of the four moisture-permeable waterproof laminated fabrics were determined and evaluated. Table 1 shows the results.

TABLE 1

| Laminated fabric | A | B | C | D |
|---|---|---|---|---|
| Formulation for 2nd step | 2 | 3 | 4 | 5 |
| Properties | | | | |
| Water repellency | 100 | 100 | 100 | 100 |
| Water pressure resistance (mm) | 2100 | 2200 | 2100 | 2100 |
| Moisture permeability (g/m² · 24 hrs) | 8800 | 9400 | 9300 | 8500 |
| Abrasion resistance | O | O | O | O |

Table 1 shows that the four laminated fabrics of the example were above 2000 mm in water pressure resistance and had moisture permeability of above 8000 g/m².24 hrs although their water repellency is 100, while the films had high abrasion resistance. Moreover the fabrics had a soft hand, and the films, which were smooth-surfaced, had a good feel. The fabrics were found suitable for making outer jackets and parkas having a single fabric layer.

EXAMPLE 2

A taffeta of the same specifications as the one used in Example 1 was subjected to the same pretreatment (scouring through calendering) as in Example 1. The fabric was then coated with a resin solution of Formulation 6 below having a resin solids concentration of 18% by a knife-over-roll coater in an amount of 80 g/m² and then immersed in a water bath at 20° C. for 30 seconds to coagulate the resin.

| Formulation 6 | |
|---|---|
| PAU resin X | 100 parts |
| CORONATE HL | 1 part |
| (isocyanate compound, product of Nippon Polyurethane Kogyo Co., Ltd.) | |
| CRISVON ASSISTOR SD-7 | 1 part |
| (nonionic surfactant serving as pore forming agent, product of Dainippon Ink & Chemicals Inc.) | |

| Formulation 6 | |
|---|---|
| Dimethylformamide | 23 parts |

The laminated fabric was immersed in hot water at 60° C. for 10 minutes, then dried, thereafter impregnated with 5% solution of Asahi Guard AG 804, brand name for 1,1,1-trichloroethane solution of a fluorine water repellent (product of Asahi Glass Co., Ltd.), by padding (pick-up ratio: 30%) and heat-treated at 160° C. for 1 minute to obtain a moisture-permeable waterproof laminated fabric of the present example.

The fabric and a laminated fabric prepared in Comparative Example 1 given later were tested for properties, with the results given in Table 2.

The sections and coating surfaces of these fabrics were photographed under a scanning electron microscope to check the diameter of the fine pores and the structure of microcells in the direction of thickness of the film from the photographs. Table 2 shows the results. The friction leak test listed in Table 2 was conducted using a rubbing tester (Gakushin type). The fabric was rubbed 100 times under a load of 200 g/cm$^2$ while maintaining the fabric surface in a wet state, and was then checked for leaks for evaluation.

Table 2 reveals that the laminated fabric of the present example exhibits moisture permeability of 8,500 g/m$^2$. 24 hrs although having water pressure resistance of above 2,000 mm. Thus the fabric is outstanding in both moisture permeability and waterproofness.

TABLE 2

| | Example 2 | Comp. Ex. 1 |
|---|---|---|
| Surface pore diameter of film ($\mu$) | 3 | 30 |
| Microcell structure in section | Many microcells continuous in the direction of thickness | Many microcells continuous in the direction of thickness |
| Water pressure resistance (mm) | Above 2,000 | 1,200 |
| Moisture permeability (g/m$^2$ · 24 hrs) | 8,500 | 9,000 |
| Friction leak test | No leak | Leak |

COMPARATIVE EXAMPLE 1

A taffeta of the same specifications as the one used in Example 2 was subjected to the same pretreatment (scouring through calendering) as in Example 1. A resin solution of Formulation 7 below having a resin solids concentration of 18% was applied to the fabric in an amount of 80 g/m$^2$ and then subjected to wet coagulation for film forming in the same manner as in Example 2, followed by the same water-repellency treatment as in Example 2.

| Formulation 7 | |
|---|---|
| PAU resin X | 100 parts |
| CRISVON ASSISTOR SD-7 (nonionic surfactant serving as pore forming agent, product of Dainippon Ink & Chemicals Inc.) | 3 parts |
| CRISVON ASSISTOR SD-11 (anionic surfactant serving as pore forming agent, product of Dainippon Ink & Chemicals Inc.) | 12 parts |
| Calcium carbonate (400 mesh in particle size) | 15 parts |
| Dimethylformamide | 20 parts |

The fabric obtained was satisfactory in moisture permeability but low in waterproofness as listed in Table 2.

EXAMPLE 3

The PAU resin to be used in the present example was prepared first by the following procedure.

A 985 g quantity of polytetramethylene glycol (OH value: 56.9) and 222 g of isophorone diisocyanate were reacted at 110° C. for 5 hours to obtain a urethane prepolymer (NCO equivalent: 1233) having an isocyanate ending. A 93.5 g quantity of the urethane prepolymer and 76.5 g of $\gamma$-methyl-L-glutamate NCA were dissolved in 666 g of solvent mixture of dimethylformamide/dioxane (7/3 in weight ratio), and 45 g of 2% triethylamine solution was added to the solution with stirring. The mixture was reacted at 30° C. for 5 hours, giving a satisfactorily fluid, yellowish brown, milky and turbid solution of PAU resin Y having a viscosity of 42,000 cps (25° C.) The PAU resin Y was used for Formulations 8 to 12 given later. On the other hand, a polyester resin Z was prepared which had a molecular weight of 30,000 and produced from a mixture of terephthalic acid and sebacic acid in a molar ratio of 6:4 and a mixture of ethylene glycol and neopentyl glycol in a molar ratio of 5:5 by copolymerization. The resin Z was used for Formulation 8 stated below.

Also prepared was a plain woven fabric (taffeta) formed of warps and wefts of polyester 75 denier/36 filaments and having a warp density of 120 yarns/inch and weft density of 90 yarns/inch. The fabric was scoured and dyed with a disperse dye in the usual manner and heat-treated at 160° C. for 1 minute. The fabric was then treated by a calender having mirror-finish rolls at a temperature of 170° C., pressure of 30 kg/cm and speed of 20 m/min, subsequently coated with a resin solution of Formulation 8 below having a resin solids concentration of 20% by a knife-over-roll coated in an amount of 30 g/m$^2$ and thereafter immersed in a water bath at 15° C. for 15 seconds to coagulate the resin components. The laminated fabric was thoroughly rinsed in hot water at 50° C. for 5 minutes and then dried, whereby the first step was completed.

| Formulation 8 | |
|---|---|
| PAU resin Y | 100 parts |
| Polyester resin Z | 4 parts |
| Dimethylformamide | 10 parts |

Next, as the second step, the laminated fabric obtained by the preceding step was coated, over the film surface, with a resin solution of Formulation 9 below by a knife-over-roll coater in an amount of 80 g/m$^2$ and then immersed in water bath at 15° C. for 20 seconds to coagulate the resin component.

The same film forming steps as above were repeated with use of Formulation 8 for the first step and each of Formulations 10 to 12 for the second step.

| Formulation 9 | |
|---|---|
| PAU resin Y | 100 parts |
| CRISVON ASSISTOR SD-7 | 1 part |

-continued

| (nonionic surfactant serving as pore forming agent, product of Dainippon Ink & Chemicals Inc.) | |
|---|---|
| Dimethylformamide | 20 parts |
| Formulation 10 | |
| PAU resin Y | 100 parts |
| CRISVON AW-7H | 10 parts |
| (polyurethane resin serving as pore forming agent product of Dainippon Ink & Chemicals Inc.) | |
| Dimethylformamide | 20 parts |
| Formulation 11 | |
| PAU resin Y | 100 parts |
| Polyvinylpyrrolidone | 3 parts |
| (hydrophilic high polymer having a molecular weight of 40,000 serving as pore forming agent) | |
| Dimethylformamide | 12 parts |
| Formulation 12 | |
| PAU resin Y | 100 parts |
| CRISVON ASSISTOR SD-11 | 2 parts |
| (anionic surfactant serving as pore forming agent, product of Dainippon Ink & Chemicals Inc.) | |
| CRISVON AW-7H | 5 parts |
| (polyurethane resin serving as pore forming agent, product of Dainippon Ink & Chemicals Inc.) | |
| CRISVON BL-50 | 2 parts |
| (isocyanate compound, product of Dainippon Ink & Chemicals Inc.) | |
| Calcium carbonate | 10 parts |
| (400 mesh in particle size) | |

The four laminated fabrics were then immersed in hot water at 50° C. and subsequently dried. As the third step, 5% aqueous solution of Asahi Guard 710, a fluorine water-repellent emulsion (product of Asahi Glass Co., Ltd.), was applied to the fabrics by padding (pick-up ratio: 30%) and then heat-treated at 160° C. for 1 minute to obtain moisture-permeable waterproof laminated fabrics E, F, G and H of the present example.

For comparison, comparative specimens were prepared exactly in the same manner as in the present example with the exception of omitting the first step of the example and were checked for properties. Table 3 shows the results achieved by the fabrics of the example and the comparative specimens (listed as "Comp.").

Table 3 reveals that the fabrics of the present example have good adhesion between the base fabric and the resin layer, exhibit moisture permeability of at least 7,500 g/m². 24 hrs although having water pressure resistance of above 2,000 mm and are therefore outstanding in both moisture permeability and waterproofness. All the comparative specimens prepared without the first step were low in abrasion resistance.

TABLE 3

| | E | Comp. | F | Comp. | G | Comp. | H | Comp. |
|---|---|---|---|---|---|---|---|---|
| First step | Yes | No | Yes | No | Yes | No | Yes | No |
| Formulation for second step | 9 | 9 | 10 | 10 | 11 | 11 | 12 | 12 |
| Properties | | | | | | | | |
| Water pressure resistance (mm) | Above 2,000 | Above 2,000 | Above 2,000 | Above 2,000 | Above 2,000 | Above 2,000 | Above 2,000 | Above 2,000 |
| Moisture permeability (g/m² · 24 hrs) | 7,800 | 8,000 | 8,500 | 9,000 | 8,200 | 8,800 | 7,200 | 7,500 |
| Abrasion resistance | O | X | O | X | O | X | O | X |

EXAMPLE 4

Four laminated fabrics I, J, K and L according to the present example and four comparative laminated fabrics were prepared exactly in the same manner as in Example 3 except that dyed base fabrics were subjected, before coating, to a water-repellency treatment (padding with 5% aqueous solution of Asahi Guard 730, a fluorine water-repellent emulsion manufactured by Asahi Glass Co., Ltd. (pick-up ratio: 35%), followed by heat treatment at 160° C. for 1 minute) instead of the third step (water-repellency treatment) of Example 3.

As shown in Table 4, the fabrics according to the invention were satisfactory in moisture permeability, waterproofness and abrasion resistance, whereas the four comparactive specimens were not acceptable in respect of abrasion resistance.

TABLE 4

| | I | Comp. | J | Comp. | K | Comp. | L | Comp. |
|---|---|---|---|---|---|---|---|---|
| First step | Yes | No | Yes | No | Yes | No | Yes | No |
| Formulation for second step | 9 | 9 | 10 | 10 | 11 | 11 | 12 | 12 |
| Properties | | | | | | | | |
| Water pressure resistance (mm) | 1,600 | 1,600 | 1,800 | 1,800 | 1,700 | 1,700 | 1,900 | 1,900 |
| Moisture permeability (g/m² · 24 hrs) | 8,000 | 8,200 | 8,600 | 8,900 | 8,400 | 9,000 | 7,500 | 7,800 |
| Abrasion resistance | O | X | O | X | O | X | O | X |

EXAMPLE 5

A biaxially stretched polyester film, 25μ in thickness, was coated with a resin solution of Formulation 13 below having a resin solids concentration of 20% by a knife-over-roll coater in an amount of 100 g/m² and thereafter immersed in a water bath at 15° C. for 20 seconds to coagulate the resin component.

| Formulation 13 | |
|---|---|
| PAU resin X | 100 parts |
| CRISVON BL-50 | 2 parts |
| (isocyanate compound, product of Dainippon Ink & Chemicals Inc.) | |
| CRISVON AW-7H | 8 parts |
| (polyurethane elastomer serving as pore forming agent, product of Dainippon Ink & Chemicals Inc.) | |
| Dimethylformamide | 15 parts |

The coated film was immersed in hot water at 50° C. for 10 minutes for rinsing and then dried, whereby a porous film was formed on the film.

Using a 30-mesh honeycomb-type gravure roll, the porous film was coated with a polyurethane adhesive of Formulation 14 below in an amount of 10 g/m² in the form of spots. The resulting film was adhered to a circular knit fabric made of false twist nylon yarns of 70d/36f, weighting 200 g/m² and treated with a water-repellency finish in advance (100 in water repellency according to JIS L-1096 Spray Method, 40 cc/cm².sec in air permeability). The laminated fabric was dried at 120° C. for 3 minutes.

| Formulation 14 | |
|---|---|
| CRISVON 4070 | 100 parts |
| (polyurethane adhesive, product of Dainippon Ink & Chemicals Inc.) | |
| CRISVON CL-2 | 18 parts |
| (isocyanate crosslinking agent, product of Dainippon Ink & Chemicals Inc.) | |
| CRISVON ACCEL HR | 2 parts |
| (catalyst for isocyanate crosslinking agent, product of Dainippon Ink & Chemicals Inc.) | |

The polyester film only was removed from the fabric to obtain the desired moisture-permeable waterproof laminated fabric.

The properties of the fabric were determined and evaluated with the results shown in Table 5.

For comparison, a comparative moisture-permeable waterproof laminated fabric was prepared exactly in the same manner as in the present example except that Formulation 13 including the PAU resin X was replaced by Formulation 15 below including polyurethane resin.

| Formulation 15 | |
|---|---|
| CRISVON AW-7H | 100 parts |
| (polyurethane elastomer, product of Dainippon Ink & Chemicals Inc.) | |
| CRISVON ASSISTOR SD-11 | 2 parts |
| (anionic surfactant, product of Dainippon Ink & Chemicals Inc.) | |
| CORONATE HL | 1 part |
| (isocyanate compound, product of Nippon Polyurethane Kogyo Co., Ltd.) | |
| Dimethylformamide | 15 parts |

The properties of the comparative fabric obtained were determined and evaluated with the results given in Table 5.

TABLE 5

| | Example 5 | Comparative |
|---|---|---|
| Water pressure resistance (mm) | Above 2000 | Above 2000 |
| Moisture permeability (g/m² · 24 hrs) | 7300 | 3500 |
| Peeling strength (g/cm) | 400 | 520 |
| Washing resistance | No separation between porous film and base | No separation between porous film and base |
| Elongation (%) | | |
| Warp direction | 35 | 38 |
| Weft direction | 32 | 30 |

As will be apparent from Table 5, the laminated fabric of the present invention incorporating the PAU resin X was above 7000 g/m².24 hrs in moisture permeability although having water pressure resistance of above 2000 mm and was also satisfactory in other properties, whereas the comparative fabric in which polyurethane resin was used was as low as 3500 g/m².24 hrs in moisture permeability.

EXAMPLE 6

A moisture-permeable waterproof laminated fabric was prepared exactly in the same manner as in Example 5 except that the circular knit fabric used in Example 5 was replaced by a leno woven of warp and weft yarns of nylon 100d/24f and pretreated with a water-repellency finish (warp density: 190 yarns/inch, weft density: 96 yarns/inch, water repellency 100, air permeability: 30 cc/cm²/sec).

The fabric obtained was as high as 7500 g/m².24 hrs in moisture permeability although having waterproofness of above 2000 mm, thus exhibiting outstanding moisture permeability and waterproofness, and was also as high as 450 g/cm in peeling strength. When the fabric was washed ten times by a household washing machine and thereafter checked for appearance, no separation was found between the base fabric and the porous film. Thus, the fabric had fully satisfactory resistance to washing.

EXAMPLE 7

A plain weave fabric (taffeta, as scoured and dyed with an acid dye) formed of warps of nylon 70 denier/24 filaments and wefts of nylon 70 denier/34 filaments and having a warp density of 120 yarns/inch and a weft density of 90 yarns/inch was treated by a calender having mirror-finish rolls at a temperature of 170° C., pressure of 30 kg/cm and speed of 20 m /min. Subsequently the fabric was coated with a resin solution of Formulation 16 below having a resin solids concentration of 20% by a knife-over-roll coater in an amount of 15 g/m² and thereafter immersed in a water bath at 20° C. for 30 seconds to coagulate the resin component.

| Formulation 16 | |
|---|---|
| PAU resin X | 100 parts |
| CRISVON BL-50 | 2 parts |
| (isocyanate compound, product of Dainippon Ink & Chemicals Inc.) | |
| Asahi Guard AG-804 | 2 parts |
| (solvent-type fluorine water repellent, product of Asahi Glass Co., Ltd.) | |
| Dimethylformamide | 10 parts |

Dimethylformamide 10 parts

The laminated fabric was immersed in hot water at 50° C. for 5 minutes and then dried, whereby the first step of the present example was completed.

Next, as the second step of the present example, the laminated fabric was coated, over the film surface, with a resin solution of Formulation 17 below by a knife-over-roll coater in an amount of 50 g/m², then immersed in a water bath at 20° C. for 30 seconds to coagulate the resin, thereafter rinsed in hot water at 50° C. for 10 minutes and dried to obtain a laminated fabric M having a double film.

The same first and second steps as above were repeated except that resin solutions of Formulations 18 and 19 were used for the second step to obtain like fabrics N and O, respectively.

| Formulation 17 | |
|---|---|
| PAU resin X | 100 parts |
| CRISVON ASSISTOR SD-7 | 2 parts |
| (nonionic surfactant serving as pore forming agent, product of Dainippon Ink & Chemicals Inc.) | |
| Dimethylformamide | 15 parts |
| Formulation 18 | |
| PAU resin X | 100 parts |
| CRISVON AW-7H | 8 parts |
| (polyurethane elastomer serving as pore forming | |

| -continued | |
|---|---|
| agent, product of Dainippon Ink & Chemicals Inc.) | |
| Dimethylformamide | 15 parts |

| Formulation 19 | |
|---|---|
| PAU resin X | 100 parts |
| Polyvinylpyrrolidone | 2 parts |
| (hydrophilic high polymer serving as pore forming agent and having a molecular weight of 40,000) | |
| Dimethylformamide | 15 parts |

As the third step, 5% aqueous solution of Asahi Guard AG-730 (fluorine water repellent, product of Asahi Glass Co., Ltd.) was applied to the fabrics M, N and O by padding (pick-up-ratio: 30%). The fabrics were dried and then heat-treated at 160° C. for 1 minute as stretched over a tenter.

The properties of the three moisture-permeable waterproof laminated fabrics were determined and evaluated. Table 6 shows the results.

TABLE 6

| | M | N | O |
|---|---|---|---|
| Formulation for 2nd step | 17 | 18 | 19 |
| Water repellency | | | |
| As finished | 100 | 100 | 100 |
| As washed 10 times | 95 | 95 | 95 |
| Water pressure resistance (mm) | | | |
| As finished | Above 2000 | Above 2000 | Above 2000 |
| As washed 10 times | Above 2000 | Above 2000 | Above 2000 |
| Moisture permeability (2/m² · 24 hrs) | | | |
| As finished | 8800 | 9400 | 9300 |
| As washed 10 times | 8700 | 9500 | 9100 |
| Abrasion resistance | O | O | O |

Table 6 shows that the three laminated fabrics of the present invention were above 8000 g/m².24 hrs in moisture permeability although having water pressure resistance of above 2000 mm and remained almost free of deterioration even when washed ten times repeatedly. The films had high abrasion resistance. The fabrics were found suitable for making outer jackets and parkas having a single fabric layer.

EXAMPLE 8

A taffeta of the same specifications as the one used in Example 7 was subjected to the same pretreatment (scouring through calendering) as in Example 7. An adhesive solution of Formulation 20 below having a solids concentration 10% was applied to the fabric in an amount of 10 g/m² by a 50-mesh honeycomb-type gravure roll and then dried at 120° C. for 5 minutes. The spot-to-spot spacing of the applied adhesive was about 0.3 mm.

| Formulation 20 | |
|---|---|
| LUCKAMIDE 5003 | 10 parts |
| (polyamide adhesive, product of Dainippon Ink & Chemical Co., Ltd.) | |
| Methyl alcohol | 90 parts |

Next, the fabric was coated, over the adhesive coating, with a resin solution of Formulation 21 below having a resin solids concentration of 18% by a knife-over-roll coater in an amount of 80 g/m² and then immersed in water bath at 20° C. for 2 minutes to coagulate the resin component.

| Formulation 21 | |
|---|---|
| PAU resin X | 100 parts |
| CRISVON ASSISTOR SD-7 | 1 part |
| (nonionic surfactant serving as pore forming agent, product of Dainippon Ink & Chemicals Inc.) | |
| Dimethylformamide | 23 parts |

The laminated fabric was immersed in hot water at 50° C. for 15 minutes, then dried, thereafter treated with 5% aqueous solution of Asahi Guard 710, a fluorine water-repellent emulsion (product of Asahi Glass Co., Ltd.) by padding (pick-up ratio: 30%) and heat-treated at 160° C. for 1 minute to obtain the desired moisture-permeable waterproof laminated fabric.

The fabric of the present example had high bond strength between the base fabric and the porous film, exhibited moisture permeability of 8,500 g/m² although having water pressure resistance of above 2,000 mm and was therefore outstanding in both moisture permeability and waterproofness.

What is claimed is:

1. A moisture-permeable waterproof laminated fabric comprising a water-repellent base fabric and porous film means provided on one surface of the base fabric, the porous film means being formed of a synthetic polymer composed chiefly of a polyamino acid urethane resin, the porous film means having numerous fine pores provided by microcells continuous in the direction of its thickness.

2. A laminated fabric as defined in claim 1 wherein the fine pores of the porous film means are up to 5 μm in surface diameter.

3. A laminated fabric as defined in claim 1 wherein the porous film means comprises a single porous film bonded directly to the base fabric face-to-face.

4. A laminated fabric as defined in claim 3 wherein the porous film contains a compound having a high affinity for the base fabric.

5. A laminated fabric as defined in claim 4 wherein the compound having a high affinity comprises one or a suitable mixture of an isocyanate compound, polyamide resin, polyurethane resin and polyester resin.

6. A laminated fabric as defined in claim 1 wherein the porous film means comprises a first porous film bonded directly to the base fabric face-to-face and containing a compound having a high affinity for the base fabric, and a second porous film bonded directly to the first porous film face-to-face.

7. A laminated fabric as defined in claim 6 wherein the compound having a high affinity comprises one or a suitable mixture of an isocyanate compound, polyamide resin, polyurethane resin and polyester resin.

8. A laminated fabric as defined in claim 6 wherein the second porous film contains an isocyanate compound.

9. A laminated fabric as defined in claim 1 wherein the porous film means comprises a single porous film bonded to the base fabric by an adhesive layer which is discrete two-dimensionally.

10. A laminated fabric as defined in claim 9 wherein the adhesive layer comprises a plurality of adhesive spots.

11. A laminated fabric as defined in claim 9 wherein the adhesive layer comprises a plurality of adhesive lines.

12. A process for producing a moisture-permeable waterproof laminated fabric characterized in that the process includes the film forming step of coating one surface of a base fabric with a resin solution comprising a polyamino acid urethane resin, a pore forming agent and a polar organic solvent and thereafter immersing the fabric in water; and the water-repellency treatment step of applying a water repellent to at least the base fabric and thereafter heat-treating the fabric.

13. A process as defined in claim 12 wherein the resin solution further contains a compound having a high affinity for the base fabric.

14. A process as defined in claim 13 wherein the compound having a high affinity comprises one or a suitable mixture of an isocyanate compound, polyamide resin, polyurethane resin and polyester resin.

15. A process as defined in claim 12 wherein the pore forming agent comprises one or an optional mixture of an anionic surfactant, nonionic surfactant, hydrophilic high polymer and polyurethane elastomer.

16. A process as defined in claim 12 wherein the water repellent comprises one or an optional mixture of a paraffin water repellent, silicone water repellent, zirconium water repellent and fluorine water repellent.

17. A process as defined in claim 12 wherein the film forming step is preceded by the water-repellency treatment step.

18. A process as defined in claim 12 wherein the film forming step is followed by the water-repellency treatment step.

19. A process for producing a moisture-permeable waterproof laminated fabric characterized in that the process includes the first film forming step of coating one surface of a base fabric with a resin solution comprising a compound having a high affinity for the base fabric, a polyamino acid urethane resin and a polar organic solvent and thereafter immersing the fabric in water to form a porous film on the fabric, the second film forming step of coating the porous film with a resin solution comprising a polyamino acid urethane resin, a pore forming agent and a polar organic solvent and thereafter immersing the fabric in water; and the water-repellency treatment step of applying a water repellent to at least the base fabric and thereafter heat-treating the fabric.

20. A process as defined in claim 19 wherein the resin solution for use in the second film forming step further contains an isocyanate compound.

21. A process as defined in claim 19 wherein the compound having a high affinity comprises one or a suitable mixture of an isocyanate compound, polyamide resin, polyurethane resin and polyester resin.

22. A process as defined in claim 19 wherein the pore forming agent comprises one or an optional mixture of an anionic surfactant, nonionic surfactant, hydrophilic high polymer and polyurethane elastomer.

23. A process as defined in claim 19 wherein the water repellent comprises one or an optional mixture of a paraffin water repellent, silicone water repellent, zirconium water repellent and fluorine water repellent.

24. A process as defined in claim 19 wherein the first film forming step is preceded by the water-repellency treatment step.

25. A process as defined in claim 19 wherein the second film forming step is followed by the water-repellency treatment step.

26. A process for producing a moisture-permeable waterproof laminated fabric characterized in that the process includes the adhesive layer forming step of applying a liquid adhesive to one surface of a base fabric two-dimensionally discretely and drying the adhesive to form an adhesive layer on the base fabric, the adhesive containing a compound having a high affinity for the base fabric, the film forming step of coating the adhesive layer with a resin solution comprising a polyamino acid urethane resin, a pore forming agent and a polar organic solvent and thereafter immersing the fabric in water; and the water-repellency treatment step of applying a water repellent to at least the base fabric and thereafter heat-treating the fabric.

27. A process as defined in claim 26 wherein the adhesive layer is formed by applying the adhesive in the form of a plurality of spots.

28. A process as defined in claim 26 wherein the adhesive layer is formed by applying the adhesive in the form of a plurality of lines.

29. A process for producing a moisture-permeable waterproof laminated fabric characterized in that the process includes the film forming step of coating a releasable sheet with a resin solution comprising a polyamino acid urethane resin, a pore forming agent and a polar organic solvent and thereafter immersing the sheet in water to form a porous film on the sheet, the step of bonding the porous film to one surface of a base fabric with an adhesive and thereafter peeling the sheet off the porous film; and the water-repellency treatment step of applying a water repellent to at least the base fabric and thereafter heat-treating the fabric.

30. A process as defined in claim 29 wherein the resin solution further contains an isocyanate compound.

31. A process as defined in claim 29 wherein the pore forming agent comprises one or an optional mixture of an anionic surfactant, nonionic surfactant, hydrophilic high polymer and polyurethane elastomer.

32. A process as defined in claim 29 wherein the water repellent comprises one or an optional mixture of a paraffin water repellent, silicone water repellent, zirconium water repellent and fluorine water repellent.

33. A process as defined in claim 29 wherein the bonding step is preceded by the water-repellency treatment step.

34. A process as defined in claim 29 wherein the bonding step is followed by the water-repellency treatment step.

35. A process as defined in claim 29 wherein the adhesive is applied in the form of spots or lines to the outer surface of the porous film opposite to the sheet or said one surface of the base fabric.

* * * * *